United States Patent
Guo et al.

(12)

(10) Patent No.: US 6,388,060 B1
(45) Date of Patent: *May 14, 2002

(54) PROCESS FOR THE SULFATION OF URONIC ACID-CONTAINING POLYSACCHARIDES

(75) Inventors: Steven Y. C. Guo, San Leandro, CA (US); Edward H. Conrad, Champaign, IL (US)

(73) Assignee: Vascular Therapeutics Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/433,879

(22) Filed: Nov. 4, 1999

Related U.S. Application Data

(60) Provisional application No. 60/107,396, filed on Nov. 6, 1998.

(51) Int. Cl.$^7$ .......................... C08B 37/10; C07H 23/00
(52) U.S. Cl. ...................... 536/21; 536/122; 536/123; 536/123.1; 536/124
(58) Field of Search .......................... 536/21, 122, 123, 536/123.1, 124

(56) References Cited

U.S. PATENT DOCUMENTS

| | | |
|---|---|---|
| 4,727,063 A | 2/1988 | Naggi et al. |
| 5,013,724 A * | 5/1991 | Petitou et al. ................. 514/54 |
| 5,356,883 A * | 10/1994 | Kuo et al. ..................... 514/54 |
| 5,527,893 A * | 6/1996 | Burns et al. .................. 514/53 |
| 5,739,115 A | 4/1998 | Fugedi et al. |
| 5,744,457 A | 4/1998 | Weitz et al. |
| 5,763,427 A | 6/1998 | Weitz et al. |
| 5,767,269 A | 6/1998 | Hirsh et al. |
| 6,001,820 A | 12/1999 | Hirsh et al. |
| 6,027,741 A | 2/2000 | Cialdi et al. |

FOREIGN PATENT DOCUMENTS

JP   63-218691   9/1988

OTHER PUBLICATIONS

Takano, R. et al "Sulfation of polysaccharides with sulfuric acid mediated by dicyclohexylcarbodiimide" J. Carbohyd. Chem. vol. 15, No. 4, pp. 449–457, 1996.*
Takano, R. et al "Regioselectivity in sulfation of galactosides by sulfuric acid and dicyclohexylcarbodiimide" Biosci. Biotech. Biochem. vol. 56, No. 9, pp. 1413–1416, 1992.*
Naggi, et al. (1987) Biochem. Pharmacol. 36: 1895–1900.
Mumma, et al (1970) Carbohyd. Res. 14:119–122.
Hoiberg and Mumma, (1069) J. Am Chem Soc 91: 4273–4278.
Taylor and Conrad (1972) Biochemistry 11: 1383–1388.
Nagasawa, et al (1986) Carbohyd. Res 158: 183–190.
Gilbert (1962) Chem. Rev. 62: 550–589.
Danishefsky and Siskovic (1971) Carbohyd.Res. 16: 199–205.
Casu, et al (1994) Carbhyd. Res 263: 271–284.
Ogamo, et al (1990) J. Biochem 108: 588–592.

* cited by examiner

*Primary Examiner*—James O. Wilson
*Assistant Examiner*—Leigh C. Maier
(74) *Attorney, Agent, or Firm*—Millen, White, Zelano & Branigan, P.C.

(57) ABSTRACT

This present invention provides methods of sulfating uronic acid-containing polysaccharides. High levels of sulfation can be obtained using the methods of the present invention.

19 Claims, No Drawings

PROCESS FOR THE SULFATION OF URONIC ACID-CONTAINING POLYSACCHARIDES

This application claims the benefit of the filing date of U.S. Provisional Application Ser. No. 60/107,396 filed Nov. 6, 1998.

BACKGROUND OF THE INVENTION

Polysaccharides containing uronic acid residues are found in virtually every species in Nature. These polymers include plant polysaccharides such as pectin, alginic acid, and many gums and mucilages; animal polysaccharides such as the glycosaminoglycans; and bacterial polysaccharides such as a variety of capsular materials. In such polysaccharides, the uronic acid residues may account for 10 to 100 percent of the total monosaccharide residues in the polymer. Uronic acid types that are found in these polymers include D-glucuronic, D-galacturonic, D-mannuronic, L-iduronic, and L-guluronic acids.

A number of animal uronic acid-containing polysaccharides such as heparins, chondroitin sulfates, and dermatan sulfates occur naturally with sulfate substituents in various positions on both their uronic acid and their hexosamine residues. Interestingly, the presence of sulfate groups on these uronic acid-containing polymers leads to species that have various biological and therapeutic activities. For example, heparin exhibits important anticoagulant and antithrombotic activities, whereas the bacterial *E. coli* K5 polysaccharide, which has a structure like that of heparin but which is not sulfated, lacks these activities. Similarly, chondroitin sulfate and dermatan sulfates have activities similar to those of heparin, whereas their structurally-analogous *E. coli* K4 polysaccharide, which is not sulfated, lacks these activities. In the heparin case, it has been demonstrated that both the uronic acid carboxyl groups and the sulfates are essential for the anticoagulant activity. Consequently, sulfation of unsulfated uronic acid-containing polysaccharides may convert such polymers to biologically active species. Similarly, it may be possible to generate substances with unique activities by further sulfating polymers that occur naturally as partially sulfated polysaccharides.

Two general approaches have been used extensively to sulfate polysaccharides. These include (a) the use of amine conjugates of sulfur trioxide as the sulfating agent (Gilbert (1962) Chem. Rev. 62: 550–589; Nagasawa, et al. (1986) Carbohyd. Res. 158: 183–190; Casu, et al. (1994) Carbohyd. Res. 263: 271–284), and (b) the use of a mixture of sulfuric acid and chlorosulfonic acid as the sulfating agent (Naggi, et al. (1987) Biochem. Pharmacol. 36: 1895–1900). We report here a new method for sulfation of uronic acid-containing polysaccharides. This method involves the generation of a sulfating reagent by activation of sulfate ions with carbodiimides. Such active sulfates react with the hydroxyl groups of polysaccharides, generating products with degrees of sulfation that can be controlled by modulation of the reaction conditions. The sulfuric acid/carbodiimide method described here offers a number of advantages over sulfation methods that have been reported in the scientific and the patent literature. As one example the sulfuric acid/chlorosulfonic acid reagent causes depolymerization of the polysaccharide as the sulfation proceeds so that the molecular weight of the final product is difficult to control; the carbodiimide/sulfuric acid method does not cause any depolymerization.

Previous reports have described the use of sulfuric acid and a carbodiimide to sulfate monosaccharides (Mumma, et al (1970) Carbohyd. Res. 14: 119–122; Takano, R., T. Ueda, et aL (1992) Biosci. Biotech. Biochem. 56: 1413–1416) and neutral polysaccharides (Takano, R., S. Yoshikawa, et al. (1996) J. Carbohyd. Chem. 15: 449–457). In these reports it was shown that C6 of the monosaccharides was sulfated much more rapidly than the secondary hydroxyls, but a high level of sulfation of these carbohydrates, i.e. >1 sulfate per monosaccharide residue, could not be achieved. Furthermore, this method was not applied to uronic acid-containing polysaccharides, where the use of the carbodiimide-activated sulfate reagent presents some special problems. First of all, carbodiimides activate the carboxyl groups of the uronic acid-containing polysaccharides, rendering them reactive with a variety of nucleophiles that might be present in the reaction mixture (amines, alcohols, or hydrides (Hoiberg and Mumma (1969) J. Am. Chem. Soc. 91: 4273–4278; Danishefsky, and Siskovic (1971) Carbohyd. Res. 16: 199–205; Taylor and Conrad (1972) Biochemistry 11: 1383–1388), yielding undesired products. Thus, for example, carbodiimide-activated uronic acid residues may react with hydroxyl groups on adjacent chains of the polysaccharide in the reaction mixture to form ester cross-links, thus increasing the molecular weight of the products. Also, the sulfate groups that are already present on the substrates to be sulfated may be activated by the carbodiimide, rendering them quite strong electrophiles and allowing sulfate cross-linking of the polymer chains. Furthermore, during the sulfation reaction, the formation of mixed anhydrides of the sulfuric acid and carboxylic acids may occur. In addition to yielding undesired products, these side reactions consume the sulfation reagent, lowering the concentration of the reagent and thus the extent of sulfation of the desired product. Thus, for the sulfation reaction, it is important to prevent side reactions so that the polymer is altered only by the addition of sulfates to the alcoholic hydroxyl groups. The method described here uses conditions that have been developed to minimize the side reactions and to control the degree of sulfation, yielding, maximally, greater that two sulfate residues per monosaccharide.

SUMMARY OF THE INVENTION

The present invention provides news methods for the preparation of sulfated (or oversulfated or hypersulfated) uronic acid-containing polysaccharides, including glycosaminoglycans. In such methods, tertiary or quaternary alkyl amine salts of uronic acid-containing polysaccharides are dissolved in an aprotic solvent, e.g. dimethylformamide (DMF), and an N,N-carbodiimide and sulfuric acid are added. The sulfuric acid is activated by the carbodiimide and the free hydroxyl groups of the heparinoid react readily with these activated anions. The methods described herein work efficiently for uronic acid-containing polysaccharides, and are superior to previously used carbodiimide/sulfuric acid methods described for monosaccharides and neutral polysaccharides, wherein the extent of sulfation was limited to <1 sulfate/monosaccharide. With the previously reported, more limited reaction conditions, the sulfation occurred primarily at C6 positions of the monosaccharide residues, i.e., positions that are already extensively sulfated in many of the naturally-occurring sulfated polysaccharides, including chondroitin 6-sulfate and heparinoids. The present invention provides methods whereby the conditions employed minimize the modifications of the carboxyl groups while maximizing the degree of sulfation. In the methods of the present invention, the carbodiimide or sulfate derivatives of the carboxylic acids formed during the reaction are converted back to the original carboxylic acids.

Furthermore, the polysaccharides do not become degraded or cross-linked during the reaction.

More particularly, the present invention provides a process for the preparation of sulfated uronic acid-containing polysaccharides, the process comprising: (1) converting the uronic acid-containing polysaccharide into an amine salt, and (2) 0-sulfating the amine salt of the uronic acid-containing polysaccharide with carbodiimide and sulfuric acid. The first step, wherein the alkali metal salt of the uronic acid-containing polysaccharide is converted to an amine salt, can be done by either ion exchange chromatography or by the addition of a solution of the tertiary or quaternary amine to an about 2% to about 10% solution of the uronic acid-containing polysaccharide.

In one embodiment, the present invention relates to methods for the preparation of oversulfated heparinoids, the methods generally comprising: (1) conversion of the heparinoids into solvent-soluble salts; (2) 0-sulfation of the heparinoids with carbodiimide and sulfuric acid; and (3) N-sulfation of 0-sulfated heparinoid. Quite surprisingly, the resulting heparinoids have a high degree of sulfation, up to 4 sulfates per disaccharide.

DETAILED DESCRIPTION OF THE INVENTION AND PREFERRED EMBODIMENTS

A. Definitions

The use of certain terms in this specification preferably includes reference to the products or techniques defined below in relation to those terms. "Monosaccharide," as used herein, refers to a polyhydroxy alcohol containing either an aldehyde or a ketone group, i.e., a simple sugar. Monosaccharide includes reference to naturally occurring simple sugars as well as simple sugars which have been chemically modified. Modified monosaccharides include, but are not limited to, monosaccharides that have increased or decreased sulfation or that have modified carboxyl, amino or hydroxyl groups.

"Uronic Acid," as used herein, refers to a monosaccharide in which the primary alcoholic carbon is replaced by a carboxyl group.

"Polysaccharide," as used herein, refers to a linear or branched polymer of more than 10 monosaccharides that are linked by means of glycosidic linkages.

"Oligosaccharide units," as used herein, refers to a linear or branched polymer of more than 2 monosaccharides that are linked together by means of glycosidic linkages.

"Polyanion," as used herein, refers to a molecule that possesses a large number of negative charges. "Polyanionic carbohydrates," as used herein, includes reference to carbohydrates that possess a large number of negative charges.

"Glycosaminoglycan," as used herein, includes reference to a polysaccharide composed of repeating disaccharide units. The disaccharides always contain an amino sugar (i.e., glucosamine or galactosamine) and one other monosaccharide, which may be a uronic acid (i.e., glucuronic acid or iduronic acid) as in hyaluronic acid, heparin, heparan sulfate, chondroitin sulfate or dermatan sulfate—or galactose as in keratan sulfate. The glycosaminoglycan chain may be sulfated on either moiety of the repeating disaccharide.

"Heparinoids," as used herein, refer to all structural variations of heparin and heparan sulfate. These are oligomers of at least one disaccharide or polymers of at least 18 different disaccharides, which represent their monomeric units. The disaccharides are made up of a hexuronic acid residue and a D-glucosamine residue which are linked to each other and to the other disaccharides by 1→4 linkages. The glucoasamine unit may be either N-acetylated (GlcNAc) or N-sulfated (GlcNSO$_3$). The uronic acid may be either a β-D-glucuronic acid or an α-L-iduronic acid residue. O-Sulfate substituents are found at C2 of some of the uronic acid residues and at C6 of some of the glucosamine residues. A general feature of these structures is that blocks of uronic acid→glucosamine disaccharides that contain high degrees of sulfation are separated from other such blocks by blocks of unsulfated glucosamine →N-acetylated glucosamine disaccharides. The relative length of the sulfated and unsulfated blocks differ for different heparinoids, with relatively few unsulfated disaccharides in heparins and many blocks of GlcA→GlcNAc disaccharides in heparan sulfates. Thus, in all heparinoids there are a number of unsubstituted hydroxyl groups on both the glucosamine and the uronic acid residues.

"Heparin" (or, interchangeably, "standard heparin" (SH) or "unmodified heparin," as used herein, includes reference to heparinoids that are highly sulfated and that have relatively high IdoA/GlcA ratios (1 to 10) and GlcNSO$_3$/GlcNAc ratios (1 to 10). Generally, heparin has an average molecular weight ranging from about 6,000 Daltons to 40,000 Daltons with an average of about 12,000 Daltons, depending on the source of the heparin and the methods used to isolate it.

"Heparan Sulfate" (HS), as used herein, includes reference to heparinoids that are less highly sulfated and that have relatively low IdoA/GlcA ratios (0.5–1.5) and GlcNSO$_3$/GlcNAc ratios (0.5–1.5).

"Dermatan Sulfate" (DS), as used herein, includes reference to a heterogeneous glycosaminoglycan mixture that contains disaccharide repeat units consisting of N-acetyl-D-galactosamine and D-glucuronic acids, as well as disaccharide repeat units consisting of N-acetyl-D-galactosamine and L-iduronic acid. The N-acetyl-D-galactosamine residues may be sulfated on the 4 and/or the 6 position. The uronic acids are present with variable degrees of sulfation.

"Chondroitin sulfate" (CS), as used herein, includes reference to a heterogeneous glycosaminoglycan mixture that contains disaccharide repeat units consisting of N-acetyl-D-galactosamine and D-glucuronic acids. The N-acetyl-D-galactosamine residues may be sulfated on the 4 and/or the 6 position.

"Hyaluronic acid", as used herein, includes reference to a heterogeneous glycosaminoglycan mixture that contains disaccharide repeat units consisting of N-acetyl-D-glucosamine and D-glucuronic acids.

"Alginic acid", as used herein, includes reference to a heterogeneous polysaccharide mixture that contains L-glucuronic acids and manuronic acids.

B. The Sulfation Methods of the Present Invention

The present invention provides processes for the preparation of sulfated uronic acid-containing polysaccharides, including oversulfated glycosaminoglycans, the methods generally comprising conversion of the polysaccharides into aprotic solvent soluble salts, O-sulfation of the polysaccharides with carbodiimide and sulfuric acid and, in the case of the heparinoids, N-sulfation of the O-sulfated product. The specific conditions employed during the above-described process enable one to obtain a surprisingly high degree of sulfation of the polysaccharides, i.e., up to 4 sulfates per monosaccharide. Earlier methods have described using a carbodiimide and sulfuric acid to sulfate monosaccharides and neutral polysaccharides. Although these methods demonstrated that primary hydroxyl groups were sulfated much more rapidly than the secondary hydroxyls, the conditions developed could not give a high level of sulfation of these carbohydrates, i.e., greater than 1 sulfate per monosaccharide residue. Furthermore, they did not address the special concerns required for sulfation of uronic acid-containing polysaccharides.

In the first step of the process of the present invention, an alkali metal salt, e.g., sodium, salt of a uronic acid-containing polysaccharide is converted to an amine salt, such as tributylamine salt, or to a long chain quaternary amine salt. Examples of amine salts suitable for use in the present invention include, but are not limited to, the following: trimethylamine, triethylamine, tripropylamine, tributylamine and quaternary ammonium salts. In a preferred embodiment, the amine salt is a tertiary amine salt such as tributylamine salt. In another preferred embodiment, the amine salt is a quaternary ammonium salt, such as cetylpyridium and cetyltrimethylammonium salts. These amine salts can be obtained by various ion exchange methods or by precipitation approaches:

The uronic acid-containing polysaccharide can be converted to its amine salt using standard methods and procedures known to and used by those of skill in the art. For instance, the tertiary amine salt can be obtained by ion exchange chromatography or, alternatively, by batch ion-exchange. More particularly, to generate the tertiary amine salt of the uronic acid-containing polysaccharide by ion exchange chromatography, the uronic acid-containing polysaccharide in cooled (2–8° C.) double distilled water is loaded onto an ion exchange column at refrigeration temperature (2–8° C.). The eluent from the column is then neutralized with a tertiary amine, such as tributylamine (TBA) or tripropylamine (TPA). The mixture is then lyophilized to obtain the tertiary amine salt of the uronic acid-containing polysaccharide. In a preferred embodiment, a Dowex 50W-X8 resin 20–50 mesh, ion exchange column is used. In addition, to generate the tertiary amine salt of the uronic acid-containing polysaccharide by batch ion-exchange, the uronic acid-containing polysaccharide in double distilled water is mixed with roughly the same volume of an ion exchange resin at refrigeration temperature (2–8° C.) with constant stirring. The mixture is then filtrated and neutralized by the addition of the tertiary amine, such as tributylamine (TBA) or tripropylamine (TPA). The mixture is then lyophilized to obtain the tertiary amine salt of the uronic acid-containing polysaccharide.

Alternatively, the sodium salt of the uronic acid-containing polysaccharide can be converted to a quaternary amine salt, preferably a long chain quaternary amine salt. In this embodiment, a quaternary amine, salt such as cetylpyridium chloride (CPC) or cetyltrimethylammonium bromide, is dissolved in double distilled water to make about a 5% to about a 15% solution and, more preferably, about a 10% solution. The quaternary amine salt solution is then added to about a 2% to about a 10% solution of the uronic acid-containing polysaccharide in about 5 mM to about 25 mM $Na_2SO_4$ until no further precipitation is formed. The precipitate is collected by centrifugation or filtration, and lyophilized to obtain the quaternary amine salt of the uronic acid-containing polysaccharide.

In step two of the above process, a first solution is prepared by contacting the amine salt of the uronic acid-containing polysaccharide with sulfuric acid. In a preferred embodiment, the sulfuric acid is present in about 1 to about 25 weight excess over the uronic acid-containing polysaccharide and, more preferably, in about a 3 to about a 15 weight excess to the uronic acid-containing polysaccharide. Thereafter, the first solution is contacted with an N,N'-carbodiimide to form a second solution. Examples of suitable N,N'-carbodiimides include, but are not limited to, the following: dicyclohexylcarbodiimide (DCC); diisopropyl-carbodiimide (DIC); 3-ethyl-1(3-dimethylaminopropyl) carbodiimide hydrochloride (EDC) and 1-cyclohexyl-3-(2-morpholoethyl)carbodiimide p-toluene sulfonate (CMC). Typically, the N,N'-carbodiimide is present in an amount that is equimolar to the amount of sulfuric acid used. The N,N'-carbodiimide is preferably added in three equal portions at equally spaced intervals, such as 20 minute intervals. In a preferred embodiment, DCC or EDC is the N,N'-carbodiimide used.

The second step of the above process is preferably carried out in a dipolar, aprotic solvent. Suitable dipolar, aprotic solvents include, but are not limited to, the following: dimethylformamide (DMF), dimethylsulfoxide and pyridine. In a presently preferred embodiment, dimethylformamide is employed as the solvent. In addition, the second step is preferably carried out at a temperature ranging from about 10° C. to about 35° C. and, more preferably, at a temperature of about 25° C.

After the addition of the N,N'-carbodiimide, the second solution is allowed to stand for a period of about 1.0 to 3.0 hours and, more preferably, for a period of about 1.5 hours. Thereafter, any precipitate formed is removed by filtration. One to three volumes of acetone or dichloromethane and, more preferably two volumes of acetone are added to the filtrate or, in the case where no precipitate is formed, to the second solution in order to form a precipitate. The pH of the second solution is adjusted to a pH of about 12 and, more preferably, to a pH above 13. This is typically carried out by adding about 0.1 to 3.0 N NaOH and, more preferably, about 0.5 to 2.0 N NaOH to the second solution until the pH is above 12 and, more preferably, above 13. The second solution is allowed to stand for a period of about 0.5 to 1.0 hour at a temperature of about 20° C. to 30° C. Thereafter, the pH of the second solution is lowered to a pH of about 6.0 to about 8.0 and, more preferably, to a pH of about 7.0.

In the third step of the above process, applicable primary to heparinoids, the O-sulfated uronic acid-containing polysaccharide is further N-sulfated by contacting the second solution with a sulfating agent. In a presently preferred embodiment, the N-sulfation is carried out according to the method of Lloyd, A. G., et al., *Biochem. Pharmacol.*, 20:637–648, the teachings of which are incorporated herein by reference. As such, in the third step of the above method, the sulfating agent is a complex including, but not limited to, sulfur-trioxide with an organic base and chlorosulfonic acid in pyridine. In a presently preferred embodiment, the complex is pyridine sulfur-trioxide or trimethylamine sulfur-trioxide. In a presently preferred embodiment, trimethylamine sulfur-trioxide is the sulfating agent employed. Typically, the second solution is mixed with water to form a 1% to about 3% and, more preferably, 2% O-sulfated uronic acid-containing polysaccharide aqueous solution. To this 1% to 3% O-sulfated uronic acid-containing polysaccharide aqueous solution is added sodium bicarbonate ($NaHCO_3$) to make about a 0.25–0.5 M $NaHCO_3$ solution. The N-sulfation of the O-sulfated uronic acid-containing polysaccharide is performed at a temperature of about 50° C. to about 60° C. for a period of about 3 to 6 hours by contacting the second solution with the sulfating agent such that the ratio of the sulfating agent to that of the uronic acid-containing polysaccharide is about 1:0.5 to about 1:2.

Those of skill in the art will readily appreciate that the resulting suronic acid-containing polysaccharide compounds can be subjected to further purification procedures. Such procedures include, but are not limited to, gel permeation chromatography, ultrafiltration, hydrophobic interaction chromatography, affinity chromatography, ion exchange chromatography, etc. Moreover, the molecular weight characteristics of the suronic acid-containing polysaccharide compounds of the present invention can be determined using standard techniques known to and used by those of skill in the art as described above. In a preferred embodiment, the molecular weight characteristics of the suronic acid-containing polysaccharide compounds of the present invention are determined by high performance size exclusion chromatography in conjunction with multiangle laser light scattering (HPSEC-MALLS).

EXAMPLES

The following examples are offered to illustrate, but not to limit the present invention.

A. Sulfation of Uronic Acid-containing Polysaccharides

The following examples illustrate experimental protocols which can be used to sulfate uronic acid-containing polysaccharides. As noted above, in a presently preferred embodiment of the process of the present invention, the chemical reactions leading to the preparation of the overly sulfated uronic acid-containing polysaccharides are: (1) conversion of sodium salts of the uronic acid-containing polysaccharide into amine salts, and (2) O-sulfation of the uronic acid-containing polysaccharide.

Example 1

Sulfation of Alginic Acid

Step 1: Conversion of Sodium Alginate to a Tertiary Amine Salt

Sodium alginate (0.3 gram) was dissolved in 150 milliliters of cold purified water (2–8° C.). Twenty grams of Dowex 50W-X8 ion exchange resin (20–50 mesh, H+form) was added to the Na-alginate solution. After the mixture was stirred for 5 minutes at cold, the supernatant was collected by filtration and the pH of the solution was adjusted to a pH of 6.0 to 6.5 using tributylamine. The solution was lyophilized to obtain 0.35 gram of TBA-alginate.

Step 2: O-sulfation with Carbodiimide and Sulfuric Acid

Three grams of sulfuric acid were added to 100 milliliters of DMF. The solution was allowed to cool to ambient temperature. TBA-alginate (0.3 gram) was dissolved in the sulfuric acid-DMF solution. DCC (6 grams) was added to this mixture. The reaction was carried out at ambient temperature for 2 hours with stirring. At the end of the reaction, the precipitate was removed by filtration using a glass fiber filter. Three volumes of dichloromethane were added to the supernatant to form a second precipitate. This precipitate was further dissolved into 100 milliliters of 0.5 N sodium hydroxide and the solution was kept at ambient temperature for about 30 minutes. The DCC-urea precipitate was then removed by filtration. The resulting supernatant containing the sulfated alginic acid was dialyzed against 5 time changes of dd-water, and lyophilized to obtain the final product that has 1.5 sulfate per monosaccharide.

Example 2

Sulfation of Hyaluronic Acid

Step 1: Conversion of Sodium Hyaluronate to a Tertiary Amine Salt

Sodium hyaluronate (0.3 gram) was dissolved in 150 milliliters of cold purified water (2–8° C.). Twenty grams of Dowex 50W-X8 ion exchange resin (20–50 mesh, H+form) was added to the Na-hyaluronate solution. After the mixture was stirred for 5 minutes at cold, the supernatant was collected by filtration and the pH of the solution was adjusted to a pH of 6.0 to 6.5 using tributylamine. The solution was lyophilized to obtain 0.35 gram of TBA-hyaluronate.

Step 2: O-sulfation with Carbodiimide and Sulfuric Acid

Three grams of sulfuric acid were added to 100 milliliters of DMF. The solution was allowed to cool to ambient temperature. TBA-hyaluronate (0.3 gram) was dissolved in the sulfuric acid-DMF solution. DCC (6 grams) was added to this mixture. The reaction was carried out at ambient temperature for 2 hours with stirring. At the end of the reaction, the precipitate was removed by filtration using a glass fiber filter. Three volumes of dichloromethane were added to the supernatant to form a second precipitate. This precipitate was further dissolved into 100 milliliters of 0.5 N sodium hydroxide and the solution was kept at ambient temperature for about 30 minutes. The DCC-urea precipitate was then removed by filtration. The resulting supernatant containing the sulfated hyaluronic acid was dialyzed against 5 time changes of dd-water, and lyophilized to obtain the final product that has 3 sulfate per disaccharide.

B. Oversulfation of Uronic Acid-containing Polysaccharides

The following examples illustrate experimental protocols which can be used to oversulfate uronic acid-containing polysaccharides. As noted above, in a presently preferred embodiment of the process of the present invention, the chemical reactions leading to the preparation of the overly sulfated uronic acid-containing polysaccharides are: (1) conversion of sodium salts of the uronic acid-containing polysaccharide into amine salts (2) O-sulfation of the uronic acid-containing polysaccharide and (3) N- sulfation of the O-sulfated uronic acid-containing polysaccharide.

Example 3

Oversulfation of cetylpyridium salt of heparin using 3-ethyl-1(3 -dimethylaminopropyl)carbodiimide hydrochloride (EDC)

Step 1: Conversion of Heparin to a Tertiary Amine Salt

Heparin (1.25 grams, Sigma H9399) was dissolved in 10 milliliters of 10 M $Na_2SO_4$. Cetylpyridium chloride (CPC) was dissolved in water to form a 10% solution. 3 milliliters of the CPC solution was added to the heparin solution. The mixture was centrifuged to form a pellet. The pellet was washed twice with purified water. The pellet was lyophilized to generate 2.1 grams of CPC-heparin.

Step 2: O-sulfation with Carbodiimide and Sulfuric Acid

Four grams of sulfuric acid were added to 40 milliliters of DMF. The solution was allowed to cool to ambient temperature. CPC-heparin (1 gram) was dissolved in the sulfuric acid-DMF solution. EDC (10 grams) was added to this mixture. The reaction was carried out at ambient temperature for 2 hours with stirring. After 2 hours, a precipitate was formed by the addition of two volumes of acetone. The precipitate was allowed to settle and the supernatant was decanted. The precipitate was further dissolved into 40 milliliters of 1 N sodium hydroxide and the solution was kept at ambient temperature for about 30 minutes. The oversulfated heparin was precipitated by the addition of 50% ethanol. This precipitate was collected, dialyzed against water and dried by lyophilization. The resulting over sulfated heparin had 4.01 sulfates/disaccharide.

Example 4

Oversulfation of TBA Salt of Heparin Using Dicyclohexylcarbodiimide (DCC)

Step 1: Conversion of Heparin to a Tertiary Amine Salt

Heparin (1 gram) was dissolved in 20 milliliters of purified water. A Dowex 50W-X8 ion exchange column (20–50 mesh, H+form) was equilibrated with purified water at a temperature range of about 2° C. to about 4° C. The Heparin solution was run on the Dowex column and the eluent was collected into a beaker and mixed with tributylamine (0.3 grams). The pH of the solution was adjusted to a pH of 6.0 to 6.5 using tributylamine. The solution was lyophilized to obtain 1.6 gram of TBA-heparin.

Step 2: O-sulfation with Carbodiimide and Sulfuric Acid

Four grams of sulfuric acid were added to 30 milliliters of DMF. The solution was allowed to cool to ambient temperature. TBA-heparin (1 gram) was dissolved in the sulfuric acid-DMF solution. DCC (8 grams) was added to this mixture. The reaction was carried out at ambient temperature for 2 hours with stirring. At the end of the reaction, the precipitate was removed by filtration using a glass fiber filter. Three volumes of dichloromethane were added to the supernatant to form a second precipitate. This precipitate was further dissolved into 40 milliliters of 1 N sodium hydroxide and the solution was kept at ambient temperature for about 30 minutes. The DCC-urea precipitate was then removed by filtration. The resulting supernatant containing the oversulfated heparin was precipitated by the addition of an equal volume of ethanol. This newly formed precipitate was dissolved into 40 milliliters of 0.5 M $NaHCO_3$. The pH of the resulting mixture was within the range of 8.5 to 9.0.

Step 3: N-sulfation of Oversulfated Heparin

The O-sulfated heparin was further N-sulfated by adding trimethylamine sulfur trioxide (0.5 gram) to the solution formed in step 2. The reaction was carried out at 55° C. for about 4 hours. After the N-sulfation was complete, the N-sulfated heparin solution was dialyzed against water and lyophilized to yield over sulfated heparin. The resulting over sulfated heparin had 4.07 sulfates/disaccharide.

Example 5

Oversulfation of Dermatan Sulfate

Step 1: Conversion of Dermatan Sulfate to a Cetyl Pyridium Salt

Dernatan Sulfate (2 gram) isolated from porcine intestinal mucosa by step ethanol precipitation, was dissolved in 15 milliliters of 10 mM Na2SO4. 5 milliliters of a 10% aqueous solution of cetylpyrdium were added to the dermatan sulfate solution. The mixture was centrifuged and the pellet formed was collected and washed twice with purified water. The pellet was lyophilized to obtain 2.5 grams of CPC-dermatan sulfate.

Step 2: O-sulfation with Carbodiimide and Sulfuric Acid

Four grams of sulfuric acid were added to 20 milliliters of DMF. The solution was allowed to cool to ambient temperature. CPC-dermatan sulfate (1 gram) was dissolved in the sulfuric acid-DMF solution. EDC (10 grams) was added to this mixture. The reaction was carried out at ambient temperature for 2 hours with stirring. After 2 hours, a precipitate was formed by the addition of two volumes of acetone. The precipitate was allowed to settle and the supernatent was decanted. The precipitate was further dissolved into 20 milliliters of 1 N sodium hydroxide and the solution was kept at ambient temperature for about 30 minutes. The oversulfated dermatan sulfate was recovered by the addition of 70% ethanol which resulted in a precipitate. This newly formed precipitate was dissolved in water, dialyzed against water, and lyophilized. The over sulfated dermatan sulfate obtained had 3.54 sulfates/disaccharide.

Example 6

Oversulfation of Chondroitin Sulfate

Step 1: Conversion of Chondroitin Sulfate to a Cetyl Pyridium Salt

Chondroitin Sulfate (2 gram, Sigma C8529) was dissolved in 15 milliliters of 10 mM $Na_2SO_4$ by step ethanol precipitation, was dissolved in 15 milliliters of 10 mM $Na_2SO_4$. 5 milliliters of a 10% aqueous solution of cetylprydium chloride (CPC)were added to the chondroitin sulfate solution. The mixture was centrifuged and the pellet formed was collected and washed twice with purified water. The pellet was lyophilized to obtain 2.2 grams of CPC-chondroitin sulfate.

Step 2: O-sulfation with Carbodiimide and Sulfuric Acid

Four grams of sulfuric acid were added to 20 milliliters of DMF. The solution was allowed to cool to ambient temperature. CPC-chondroitin sulfate (1 gram) was dissolved in the sulfuric acid-DMF solution. EDC (10 grams) was added to this mixture. The reaction was carried out at ambient temperature for 2 hours with stirring. After 2 hours, a precipitate was formed by the addition of two volumes of acetone. The precipitate was allowed to settle and the supernatent was decanted. The precipitate was further dissolved into 20 milliliters of 1 N sodium hydroxide and the solution was kept at ambient temperature for about 20 minutes. The oversulfated dermatan sulfate was recovered by the addition of 70% ethanol which resulted in a precipitate. This newly formed precipitate was dissolved in water, dialyzed against water, and lyophilized. The over sulfated chondroitin sulfate obtained had 2.77 sulfates/disaccharide.

Example 7

Oversulfation of Heparan Sulfate

Step 1: Conversion of Heparan Sulfate to a Cetyl Pyridium Salt

Heparan Sulfate (2 gram) isolated from porcine intestinal mucosa by step ethanol precipitation, was dissolved in 20 milliliters of 10 mM $Na_2SO_4$. 5 milliliters of a 10% aqueous solution of cetylprydium chloride were added to the heparan sulfate solution. The mixture was centrifuged and the pellet formed was collected and washed twice with purified water. The pellet was lyophilized to obtain 1.5 grams of CPC-heparan sulfate.

Step 2: O-sulfation with Carbodiimide and Sulfuric Acid

Four grams of sulfuric acid were added to 20 milliliters of DMF. The solution was allowed to cool to ambient temperature. CPC-heparan sulfate (1 gram) was dissolved in the sulfuric acid-DMF solution. EDC (10 grams) was added to this mixture. The reaction was carried out at ambient temperature for 2 hours with stirring. After 2 hours, a precipitate was formed by the addition of two volumes of acetone. The precipitate was allowed to settle and the supermatent was decanted. The precipitate was further dissolved into 20 milliliters of 1 N sodium hydroxide and the solution was kept at ambient temperature for about 30 minutes. The oversulfated heparan sulfate was recovered by the addition of 70% ethanol, which resulted in a precipitate. This newly formed precipitate was dissolved in water, dialyzed against water, and lyophilized. The over sulfated heparan sulfate obtained had 2.57 sulfates/disaccharide.

Example 8

Oversulfation of TBA Salt of Heparin Using 3-ethyl-1(3 -dimethylaminopropyl)carbodiimide Hydrochloride (EDC)

Step 1: Conversion of Heparin to a Tertiary Amine Salt

Heparin (1 gram) was dissolved in 20 milliliters of purified water. A Dowex 50W-X8 ion exchange column (20–50 mesh, H+form) was equilibrated with purified water at a temperature range of about 2° C. to about 4° C. The Heparin solution was run on the Dowex column and the eluent was collected into a beaker and mixed with tributylamine (0.3 grams). The pH of the solution was adjusted to a pH of 6.0 to 6.5 using tributylamine. The solution was lyophilized to obtain 1.6 gram of TBA-heparin.

Step 2: O-sulfation with Carbodiimide and Sulfuric Acid

Four grams of sulfuric acid were added to 40 milliliters of DMF. The solution was allowed to cool to ambient temperature. TBA-heparin (1 gram) was dissolved in the sulfuric acid-DMF solution. EDC (10 grams) was added to this mixture. The reaction was carried out at ambient temperature for 2 hours with stirring. After 2 hours, a precipitate was formed by the addition of two volumes of acetone. The precipitate was allowed to settle and the supernatant was decanted. The precipitate was further dissolved into 40 milliliters of 1 N sodium hydroxide and the solution was kept at ambient temperature for about 30 minutes. The oversulfated heparin was recovered by precipitation by the addition of an equal volume of alcohol. This precipitate was collected and dissolved in water. It was dialyzed against water and dried by lyophilization. The yield of the oversulfated heparin was about 0.5 grams.

Step 3: N-sulfation of Oversulfated Heparin

The O-sulfated heparin was further N-sulfated by incubating 0.5 grams of oversulfated heparin in a 0.5 M NaHCO$_3$ solution with 250 milligrams of trimethylamine sulfur trioxide at a temperature of 60° C. for about 3 hours. After the N-sulfation was complete, the N-sulfated heparin solution was dialyzed against water and lyophilized to yield 0.45 grams of over sulfated heparin. The resulting over sulfated heparin had 3.88 sulfates/disaccharide.

Example 9

Oversulfation of TBA Salt of Heparin Using 3-ethyl-1(35 -dimethylaminopropyl)carbodiimide Hydrochloride (EDC)

Step 1: Conversion of Heparin to a Tertiary Amine Salt

Heparin (1 gram) was dissolved in 20 milliliters of purified water. A Dowex 50W-X8 ion exchange column (20–50 mesh, H$^+$ form) was equilibrated with purified water at a temperature range of about 2° C. to about 4° C. The Heparin solution was run on the Dowex column and the eluent was collected into a beaker and mixed with tributylamine (0.3 grams). The pH of the solution was adjusted to a pH of 6.0 to 6.5 using tributylamine. The solution was lyophilized to obtain 1.6 gram of TBA-heparin.

Step 2: O-sulfation with Carbodiimide and Sulfuric Acid

One gram of sulfuric acid were added to 20 milliliters of DMF. The solution was allowed to cool to ambient temperature. TBA-heparin (0.5 gram) was dissolved in the sulfuric acid-DMF solution. EDC (2 grams) was added to this mixture. The reaction was carried out at ambient temperature for 2 hours with stirring. After 2 hours, a precipitate was formed by the addition of two volumes of acetone. The precipitate was allowed to settle and the supernatent was decanted. The precipitate was further dissolved into 20 milliliters of 1 N sodium hydroxide and the solution was kept at ambient temperature for about 30 minutes. The oversulfated heparin was recovered by precipitation by the addition of an equal volume of ethanol. This precipitate was collected and dissolved in water. It was dialyzed against water and dried by lyophilization. The yield of the oversulfated heparin was about 0.250 grams. The resulting over sulfated heparin had 3.35 sulfates/disaccharide.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes.

What is claimed is:

1. A process for sulfating a uronic acid-containing polysaccharide, said process comprising:

a) conversion of said uronic acid-containing polysaccharide to an amine salt of said uronic acid-containing polysaccharide;

b) treating said amine salt of said uronic acid-containing polysaccharide, dissolved in an aprotic solvent, with sulfuric acid to form a first solution and addition of N,N' carbodiimide to said first solution to form a second solution;

c) adjusting the pH of said second solution to a pH above 12 for a period of time ranging from about 30 minutes to about 60 minutes and, thereafter, adjusting the pH of said second solution to a pH of about 7; and d) contacting said second solution with a sulfating agent to form said sulfated uronic acid-containing polysaccharide.

2. The process in accordance with claim 1, wherein said amine salt in step (a) is either a quaternary amine salt or a tertiary amine salt.

3. The process in accordance with claim 2, wherein said tertiary amine salt is a member selected from the group consisting of trimethylamine, triethylamine, tripropylamine, tributylamine, or pyridine.

4. The process in accordance with claim 2, wherein said quaternary amine salt is a member selected from the group consisting of cetylpyridium and cetyltrimethylammonium salts.

5. The process in accordance with claim 1, wherein said N,N'-carbodiimide is a member selected from the group consisting of dicyclohexylcarbodiimide, diisopropylcarbodiimide, 3-ethyl-1-(3-dimethylaminopropyl)carbodiimide hydrochloride, and 1-cyclohexyl-3-(2-morpholoethyl)carbodiimide p-toluene.

6. The process in accordance with claim 1, step (d), wherein said sulfating agent is selected from a group consisting of trimethylamine sulfur trioxide complex and pyridine sulfur trioxide.

7. The process in accordance with claim 1, wherein step (b) is carried out at a temperature of about 10° C. to about 35° C. and for about 1 to about 3 hours.

8. The process in accordance with claim 1, where in step (d) is carried out at a temperature of about 50° C. to about 60° C.

9. The process in accordance with claim 1 wherein, the ratio of said sulfating agent to said uronic acid-containing polysaccharide is 1:0.5 to 1:2.

10. A process for sulfating dermatan sulfate, said process comprising:

a) converting said dermatan sulfate to an amine salt of dermatan sulfate;

b) treating said amine salt of dermatan sulfate with sulfuric acid to form a first solution and addition of an N,N' carbodiimide to form a second solution;

c) adjusting the pH of said second solution to a pH above 12 for a period of time ranging from about 30 minutes to about 60 minutes and, thereafter, adjusting the pH of said second solution to a pH of about 7; and d) contacting said second solution with a sulfating agent to form oversulfated dermatan sulfate.

11. A process for sulfating heparin, said process comprising:
   a) converting said heparin to an amine salt of heparin;
   b) treating said amine salt of heparin with sulfuric acid to form a first solution and addition of an N,N' carbodiimide to said first solution to form a second solution;
   c) adjusting the pH of said second solution to a pH above 12 for a period of time ranging from about 30 minutes to about 60 minutes and, thereafter, adjusting the pH of said second solution to a pH of about 7; and
   d) contacting said second solution with a sulfating agent to form sulfated heparin.

12. A process for sulfating dermatan sulfate or chondroitin sulfate, said process comprising:
   (a) converting said dermatan sulfate, or chondroitin sulfate to an amine salt of dermatan sulfate, or an amine salt of chondroitin sulfate;
   (b) treating said amine salt of dermatan sulfate or chondroitin sulfate, dissolved in an aprotic solvent, with sulfuric acid to form a first solution and adding N,N' carbodiimide, to said first solution to form a second solution to initiate and maintain a sulfating reaction for a period of time from about 1 hour to about 3 hours; and
   (c) treating said second solution with base in an aqueous solution at pH above 13 for a period of time ranging from about 30 minutes to about 60 minutes and, thereafter, adjusting the pH of said second solution to a pH of about 7.

13. A process for sulfating heparin, said process comprising:
   (a) converting said heparin to an amine salt of heparin;
   (b) treating said amine salt of heparin, dissolved in an aprotic solvent, with sulfuric acid to form a first solution and adding N,N' carbodiimide, to said first solution to form a second solution to initiate and maintain a sulfating reaction for a period of time from about 1 hour to about 3 hours;
   (c) treating said second solution with base in an aqueous solution at a pH above 13 for a period of time ranging from about 30 minutes to about 60 minutes and, thereafter, adjusting the pH of said second solution to a pH of about 7; and
   (d) contacting said second solution with a sulfating agent to form sulfated heparin.

14. A process for sulfating heparan sulfate, said process comprising:
   (a) converting said heparan sulfate to an amine salt of heparin sulfate;
   (b) treating said amine salt of heparan sulfate, dissolved in an aprotic solvent, with sulfuric acid to form a first solution and adding N,N' carbodiimide, to said first solution to form a second solution to initiate and maintain a sulfating reaction for a period of time from about 1 hour to about 3 hours;
   (c) treating said second solution with base in an aqueous solution at a pH above 13 for a period of time ranging from about 30 minutes to about 60 minutes and, thereafter, adjusting the pH of said second solution to a pH of about 7; and
   (d) contacting said second solution with a sulfating agent to form sulfated heparan sulfate.

15. A process for sulfating alginic acid and hyaluronic acid, said process comprising:
   (a) converting said alginic acid or hyaluronic acid to an amine salt of algniniate, or an amine salt of hyaluronate;
   (b) treating said amine salt of alginate or hyaluronate, dissolved in aprotic solvent, with sulfuric acid to form a first solution and adding N,N' carbodiimide to said first solution to form a second solution to initiate and maintain a sulfating reaction for a period of time from about 1 hour to about 3 hours; and
   (c) treating said second solution with base in an aqueous solution at a pH above 13 for a period of time ranging from about 30 minutes to about 60 minutes and, thereafter, adjusting the pH of said second solution to a pH of about 7.

16. The process according to claim 1, wherein said sulfuric acid is present in a 1 to 25 fold weight excess over said uronic acid-containing polysaccharides.

17. The process according to claim 1, wherein said N,N' carbodiimide is present in an equal molar ratio to said sulfuric acid.

18. A process for sulfating a uronic acid-containing polysaccharide, said process comprising:
   (a) converting said uronic acid-containing polysaccharide to an amine salt of said uronic acid-containing polysaccharide;
   (b) treating said amine salt of said uronic acid-containing polysaccharide, dissolved in an aprotic solvent, with sulfuric acid to form a first solution and adding N,N' carbodiimide to said first solution to form a second solution; and
   (c) adjusting the pH of said second solution to a pH above 12 for a period of time ranging from about 30 minutes to about 60 minutes and, thereafter, adjusting the pH of said second solution to a pH of about 6 to about 8.

19. The process according to claim 1, wherein the amount of said sulfuric acid is in a 3 to 15 fold weight excess over said uronic acid-containing polysaccharides.

* * * * *